United States Patent [19]

Covington et al.

[11] 4,091,658
[45] May 30, 1978

[54] ELECTRONIC FLUID PIPELINE LEAK DETECTOR AND METHOD

[75] Inventors: Morris T. Covington; Steven M. Griffin, both of Houston, Tex.

[73] Assignee: Shafer Valve Company, Mansfield, Ohio

[21] Appl. No.: 638,342

[22] Filed: Dec. 8, 1975

Related U.S. Application Data

[62] Division of Ser. No. 530,709, Dec. 9, 1974, Pat. No. 4,012,944.

[51] Int. Cl.² ............................................. G01M 3/00
[52] U.S. Cl. ............................................... 73/40.5 R
[58] Field of Search ............. 73/40.5 R, 40; 340/242; 137/459, 458, 460, 12

[56] References Cited

U.S. PATENT DOCUMENTS 3,161,207  12/1964  McCarvell et al. ................. 137/458
3,664,357   5/1972  Kreiss ............................... 73/40.5 R Primary Examiner—Donald O. Woodiel
Attorney, Agent, or Firm—Hamilton, Renner & Kenner

[57] ABSTRACT

Disclosed is an instrument wherein the pressure or flow of a fluid in a pipeline is monitored with a voltage proportional thereto being electronically differentiated to determine whether any rate of change of pressure exists, which is often indicative of a leak in the pipeline. If a rate of pressure change of a predetermined extent exists for a predetermined period of time and if a total pressure change exceeds a predetermined value, an output signal can close a valve in the pipeline or can sound an alarm. In addition, in situations where a liquid is involved, a surge develops upon a line break, that is, a large rate of instantaneous pressure drop, and such surge can also be detected and appropriate remedial measures taken. The instrument is also capable of shutting down the pipeline in instances of inordinately low or high pressure conditions.

5 Claims, 2 Drawing Figures

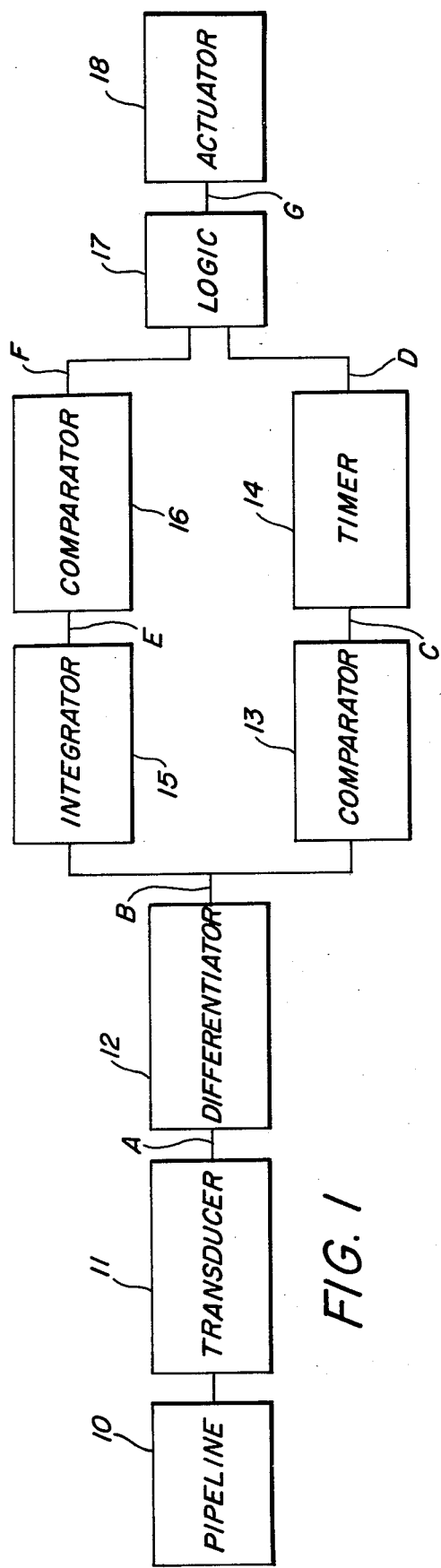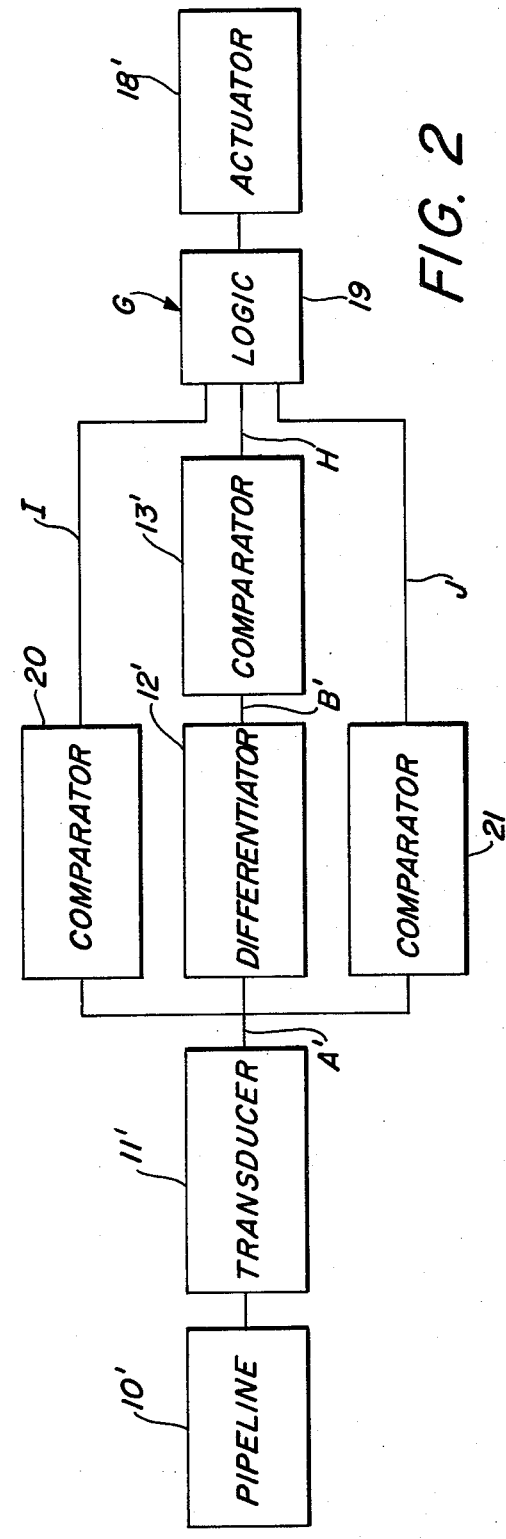

ELECTRONIC FLUID PIPELINE LEAK DETECTOR AND METHOD

This is a division of application Ser. No. 530,709, filed Dec. 9, 1974, now U.S. Pat. No. 4,012,944.

BACKGROUND OF THE INVENTION

This invention relates to a method and apparatus for detecting leaks in fluid pressurized vessels, the most typical being a pipeline. More particularly, this invention relates to an electronic instrument and method of operation thereof, which can detect the rate of change of pressure or flow and total pressure or flow change caused by a break or leak in a pipeline carrying a liquid or gas, and take remedial measures therefor.

Fluids such as natural gas, oil or the like, are often transported over long distances by pipeline. It is often important to quickly detect leaks or breaks in the pipeline, not only for a conservation of the fluid, but also in the case of flammable, toxic or like fluids, for safety purposes. A break or leak is most often characterized by a pressure drop over a period of time with some pressure drops being rapid and others being quite slow. The prior art is characterized by a number of devices which attempt to detect the leak by monitoring this pressure change. For example, U.S. Pat. Nos. 2,836,192 and 2,915,042 are typical mechanical/pneumatic devices designed for that purpose. These types of devices are usually only workable with gas lines as opposed to liquid lines and can have certain drawbacks even when operating on gas lines. For example, these devices often fail to detect small rates of pressure change, which, if existing over a long period of time, must be detected. Then too, these devices are susceptible to failure due to the plugging of orifices, condensation in the rate tanks which changes the volume thereof, and corrosion of the various parts, the latter occurring when the pipeline is carrying a caustic or sour gas.

Some electronic devices have been developed in an attempt to avoid the aforementioned problems. These devices can satisfactorily detect changes in pressure over a period of time and if a greater pressure rate of change is detected than a preselected amount, remedial measures can be taken. However, if a change in pressure greater than the preselected amount occurs, followed by a period of relative pressure stability, followed again by a change in pressure greater than the preselected amount, etc., the total pressure drop would be indicative of a problem in the pipeline but would go undetected by this device. Similarly, fluctuations in line pressure, not resulting in an appreciable pressure change could falsely activate these prior art devices.

Other systems for detecting leaks or breaks in pipelines have been directed to detecting variations in the intensity of the sound of the flowing gas. These devices have met with little success in that background noises are indistinguishable thus often causing false alerts. In addition, like the other prior art discussed above, these systems are not applicable to liquids where a surge or large instantaneous rate of pressure drop exists upon a break.

Additionally, none of the prior art of which I am aware provides the additional feature of a means to shut down the system under inordinately low or high pressure situations whether or not a break is indicated.

SUMMARY OF THE INVENTION

It is thus an object of the present invention to provide a method performed by an electronic device which detects breaks or leaks in pressurized vessels such as a fluid pipeline.

It is another object of the present invention to provide a method and device, as above, which detects both the rate of pressure drop and the total pressure drop in the pipeline.

It is a further object of the present invention to provide a device, as above, which is not susceptible to the problems encountered by mechanical pneumatic systems used for similar purposes.

It is still another object of the present invention to provide a method and device, as above, which can be used for pipelines carrying a gas or a liquid.

It is an additional object of the present invention to provide a method and device, as above, which can detect the instantaneous surge of pressure change caused by a break or leak in a fluid carrying pipeline.

It is yet another object of the present invention to provide a method and device, as above, which can monitor the flow of the fluid in the pipeline to determine the presence of a break or leak therein.

It is yet a further object of the present invention to provide a method and device, as above, with the capability of detecting high or low pressure pipeline conditions whether or not a break in the pipeline exists.

These and other objects of the present invention, which will become apparent from the following description, are accomplished by improvements hereinafter described and claimed.

In general, in a method and apparatus for detecting irregularities in a fluid pipeline, a characteristic, such as pressure or flow, of the fluid is monitored with an output signal proportional thereto differentiated to produce a signal proportional to the rate of change of the characteristic. This signal is compared with a preselected maximum tolerable rate of change and when that maximum is exceeded, a signal is sent to a timing device. If the signal is of a duration longer than a predetermined time, a signal is transmitted to a logic circuit preferably in the form of a gate. In the meantime, the signal proportional to the rate of change is integrated to determine the total change of the characteristic. This total change is compared with a preselected maximum tolerable total change and when that maximum is exceeded, a signal is sent to the gate. Thus, if both conditions are met, that is, a rate of change and total change both in excess of the preselected tolerable maximums, remedial measures, such as closing a valve or sounding an alarm, can be taken.

BRIEF DESCRIPTION OF THE DRAWINGS

FIG. 1 is a block diagram of a device according to the present invention for use with fluid pipelines.

FIG. 2 is a block diagram depicting an adaptation of the device according to the present invention specifically usable for liquid pipelines and in addition showing various adjuncts to the present invention whether used for a liquid or gas pipeline.

DESCRIPTION OF THE PREFERRED EMBODIMENT

A fluid carrying pipeline 10 is shown in block form in FIG. 1 to carry gases or liquids usually at high pressures quite often over a long distance. A "pipeline" is shown and referred to herein as the fluid carrying vessel, it being understood that the subject invention could have utility with any pressurized vessel such as a fluid storage vessel. The pressure within pipeline 10 is desirably held at a substantially constant pressure although often small pressure changes will occur without an attendant problem. However, if pipeline 10 should break or develop a leak, the pressure therein will change and corrective steps should be taken. A conventional transducer 11 in the preferred form monitors pipeline fluid pressure, and "pressure" will be the fluid characteristic generally referred to throughout this description. However, it should be understood that other fluid characteristics, such as flow, could be monitored without departing from the spirit of this invention.

The output of transducer 11, at point A, is thus a voltage signal proportional to fluid pressure. A conventional differentiator circuit 12 receives the output of transducer 11 and differentiates the same so that the output, at point B, is a voltage signal which is proportional to the rate of change of pressure with respect to time ($dp/dt$). If the pipeline fluid pressure is constant, this signal will, of course, be zero. However, once a pressure change exists, a B signal of some magnitude will correspondingly be created.

The output of differentiator 12 is received by a comparator 13 which compares the B signal proportional to pressure rate of change with a preselected signal proportional to a pressure rate of change set into comparator 13. This preselected signal could be set at a maximum tolerable rate of change value, that is, a value which if exceeded would in and of itself be indicative of a potential pipeline problem. The prior art would have used such a setting. However, because of other features of this invention, to be hereinafter described, this setting can be set to detect small pressure fluctuations, on the order of about one-half psi per minute without giving false alarms. When the B signal exceeds the preselected value, a timer 14, which can be a monostable multivibrator, is activated by signal C out of comparator 13. Timer 14 can have a variable time period or time delay set therein. That is, timer 14 can be set so that it will not "time out" for whatever period desired, typically ranging from 30 seconds to 180 seconds. Thus, if after that time period the C signal from comparator 13 is still being received, an output signal D is exhibited by timer 14. If, however, during the time delay period, the rate of pressure change has dropped below the preselected level such that the C signal no longer exists, no D signal will be transmitted by timer 14. Rather, timer 14 will merely be automatically reset to await another C signal.

The B signal out of differentiator 12 is also fed to a conventional integrator 15 which, as is well known in the art, electronically takes the integral of its input signal. Thus, the output of integrator 15, E, is a voltage proportional to the total change in pressure sensed by transducer 11. This E signal is fed to a comparator 16 which compares the E voltage with a preselected signal proportional to a total pressure difference set into comparator 16. This preselected signal is set at a maximum tolerable total pressure difference value, that is, a value which if exceeded indicates a potential pipeline problem. This value should be high enough so that small pressure differentials not associated with a break or leakage will be ignored. In pipelines running at about 700 psi, a total pressure change of from five to 30 psi is a typical setting dependent on the sensitivity desired.

When the E signal exceeds that preselected value, comparator 16 puts out a signal F indicative of such.

The D signal out of timer 14 and the F signal out of comparator 16 are fed to a logic circuit 17 which could be an OR gate but which most often will be an AND gate. As such, logic circuit 17 will only exhibit an output signal G when it receives both a D and an F signal. In effect this means that a G signal will exist only when there has been a total pressure change in excess of the preselected value set into comparator 16 and a rate of pressure change in excess of the preselected value set into comparator 13 for a predetermined period of time as dictated by the time delay set into timer 14. In the circuit of FIG. 1, when such conditions are satisfied, the G signal actuates remedial measures through actuator 18 which can be, for example, a solenoid valve which would operate to close the pipeline until the problem could be found or can be an audio or visual alarm which would alert the operator to the problem.

In an example of the operation of the circuit of FIG. 1, it will be assumed that the pipeline is operating at 700 psi, that the preselected pressure rate of change set into comparator 13 is one-half psi per minute, that the time delay set into timer 14 is 30 seconds, and that the maximum tolerable total pressure drop set into comparator 16 is 5 psi. If now a break in the pipeline occurs, trandsucer 11 senses the change in pressure and differentiator 12 determines the rate of change of pressure. For this example assume that the rate of change, that is, the B signal, is 2 psi per minute. Comparator 13 would immediately sense that the rate of change was greater than its one-half psi per minute and the C signal would start timer 14. After 30 seconds, if the 2 psi per minute pressure drop continued to exist, the D signal would appear to the logic AND gate 17. In the meantime integrator 15 would be calculating the total pressure drop E but after 30 seconds that total pressure drop will only be one psi and thus comparator 16 will not exhibit an F signal and logic circuit 17 will not exhibit the actuating G signal. In this manner, if the pressure drop had been due to something other than a line break, for example, a compressor in the line might have been shut down causing a small pressure drop of short duration, corrective measures would not be taken. But after 2½ half minutes of a 2 psi per minute drop, comparator 16 would sense that the five psi setting has been exceeded and exhibit the F signal which coupled with the already existing D signal would take corrective measures. In this manner only drops in pressure above a predetermined amount and above a predetermined rate will be recognized but line fluctuations which could be minor will be ignored.

In FIG. 2, circuitry is displayed which could be operated in and of itself or which ideally could be an adjunct to the circuit of FIG. 1. For clarity, a number of FIG. 1 circuit elements are repeated in FIG. 2, it being understood that some of the identical elements of FIG. 1 could be employed or additional separate elements could be utilized. When a pipeline, designated by the numeral 10' in FIG. 2, is carrying a liquid, a special phenomenon exists upon the occurrence of a break or leak. A pressure surge is created in the fluid, this surge being characterized by an essentially instantaneous pressure drop, that is, an extremely high rate of pressure drop but only a small overall pressure drop. Such a drop may go undetected by the circuit of FIG. 1 in that while comparator 13 would sense the drop, the total drop would not be large enough to exceed the setting of and thereby activate comparator 16.

To detect such a surge, transducer 11', like transducer 11, monitors the pressure in the line having an output A' proportional thereto. A differentiator circuit 12' receives the A' signal and differentiates the same so that its output, B', is a signal which is proportional to the rate of change of pressure with respect to time ($dp/dt$). A comparator 13' receives the B' signal and like comparator 13 compares this signal with a preselected maximum tolerable rate of change. Because comparator 13' should be set to detect the surge phenomenon, the setting thereof can usually be in the neighborhood of 100 to 300 psi per second. When such is exceeded by a surge, a signal H could immediately initiate remedial measures through actuator 18' or as shown in FIG. 2, could be sent to a logic circuit 19. Logic circuit 19, in the form of a conventional OR gate, would be employed if the surge circuit just described were used in conjunction with the FIG. 1 circuit or other circuits yet to be described. Thus, as shown in FIG. 2, if the circuit of FIG. 1 were to be used with the surge circuit, the G signal from FIG. 1 could be sent to the logic OR gate 19 before going to the actuator. In this instance then, either a surge signal H or the signal G would initiate the remedial measures.

It should be evident that by employing the OR logic 19, other characteristics of the pipeline can be used to control actuator 18'. For example, the A or A' signal indicative of pressure can be fed to a high pressure comparator 20. This comparator also receives a predetermined set signal corresponding to a maximum tolerable pipeline pressure. If the A signal would exceed that maximum, and I signal indicative of such would be sent from comparator 20 to logic circuit 19 and the system shut down by actuator 18 or 18' so that the cause of the high pressure could be determined and corrected.

Similarly, a low pressure comparator 21 can receive the A or A' signal and compare it with a predetermined set signal corresponding to a maximum tolerable low pressure in the pipeline. If the A signal would go below that predetermined signal, a J signal indicative of intolerable low pressure in the pipeline would be sent from comparator 21 to logic circuit 19 and the system shut down by actuator 18 or 18' so that the cause of the low pressure could be determined and corrected.

Thus, four individual circuits, the circuit of FIG. 1, the surge circuit, the high pressure cutoff circuit and the low pressue cutoff circuit, can selectively initiate the corrective measures through actuator 18. It should be evident that this can be done through the OR gate logic 19 or could be done by four individual module-like circuits each having their own actuator. In addition, if desired, the logic 19 could be in the form of an AND gate such that the actuator 18 would not initiate corrective measures until any number or all of the circuits indicated the existence of a problem.

It should thus be evident that the device disclosed and method of operation thereof enables one to monitor pipeline characteristics and take remedial measures when a predetermined intolerable situation exists thus substantially improving the pipeline control art.

We claim:

1. A system for detecting breaks, leakages or the like in a liquid carrying pipeline or the like comprising means monitoring the pressure of the liquid in the pipeline and providing an output signal proportional thereto, means receiving the output signal proportional to pressure and providing an output signal proportional to the rate of change of pressure with respect to time, means comparing the output signal proportional to the rate of change of pressure with a preselected rate of change of pressure representative of a surge in the liquid and providing an output signal when the output signal proportional to the rate of change of pressure exceeds the preselected rate of change of pressure, and means receiving the output of said last named means and initiating remedial measures.

2. A process of utilizing an electronic signal proportional to the rate of change of pressure of a liquid in a pipeline or the like to detect a break, leakage or the like in he pipeline comprising the steps of comparing the rate of change of pressure with a high rate of pressure change on the order of approximately 100 to 300 psi per second representing an instantaneous surge of liquid in the pipeline, and shutting down the pipeline when the rate of change of pressure exceeds said high rate of pressure change.

3. Apparatus for detecting irregularities in pressure in a fluid carrying pipeline or the like comprising transducer means monitoring the pressure of the fluid in the pipeline and providing an output signal proportional thereto, first means receiving the output signal of said transducer means and providing an output signal if the pressure in the pipeline is in excess of a predetermined amount, second means receiving the output signal of said transducer means and providing an output signal if the pressure in the pipeline is below a predetermined amount, third means receiving the output signal of said transducer means and providing an output signal upon a surge in pressure in the pipeline, and logic means receiving the signals from said first, second and third means and selectively initiating corrective measures in said pipeline.

4. Apparatus for detecting irregularities in pressure in a fluid carrying pipeline or the like comprising transducer means monitoring the pressure of the fluid in the pipeline and providing an output signal proportional thereto, first means receiving the output signal of said transducer means and providing an output signal upon a surge in pressure in the pipeline to initiate corrective measures in the pipeline, second means receiving the output signal of said transducer means and providing an output signal if the pressure in the pipeline is in excess of a predetermined amount, and logic means receiving the output signals of said first and second means and selectively initiating corrective measures in the pipeline.

5. Apparatus for detecting irregularities in pressure in a fluid carrying pipeline or the like comprising transducer means monitoring the pressure of the fluid in the pipeline and providing an output signal proportional thereto, first means receiving the output signal of said transducer means and providing an output signal upon a surge in pressure in the pipeline to initiate corrective measures in the pipeline, second means receiving the output signal of said transducer means and providing an output signal if the pressure in the pipeline is below a predetermined amount, and logic means receiving the output signals of said first and second means and selectively initiating corrective measures in the pipelines.

* * * * *